(12) United States Patent
Neal

(10) Patent No.: US 7,920,755 B2
(45) Date of Patent: Apr. 5, 2011

(54) VIDEO CONTENT DETECTOR

(75) Inventor: Greg Neal, Morgan Hill, CA (US)

(73) Assignee: Genesis Microchip Inc., Santa Clara, CA (US)

( * ) Notice: Subject to any disclaimer, the term of this patent is extended or adjusted under 35 U.S.C. 154(b) by 1141 days.

(21) Appl. No.: 11/613,009

(22) Filed: Dec. 19, 2006

(65) Prior Publication Data

US 2007/0297669 A1 Dec. 27, 2007

Related U.S. Application Data

(60) Provisional application No. 60/816,903, filed on Jun. 26, 2006.

(51) Int. Cl.
*G06K 9/40* (2006.01)
*G06K 9/00* (2006.01)

(52) U.S. Cl. .................. 382/266; 382/162; 382/168

(58) Field of Classification Search .............. 382/162, 382/164, 168, 171, 172, 173, 266; 358/453, 358/462, 465, 466
See application file for complete search history.

(56) References Cited

U.S. PATENT DOCUMENTS

| | | | | |
|---|---|---|---|---|
| 4,577,235 A | * | 3/1986 | Kannapell et al. | ............ 358/462 |
| 5,546,474 A | | 8/1996 | Zuniga | |
| 5,742,704 A | | 4/1998 | Suzuki et al. | |
| 5,847,773 A | | 12/1998 | Lagoni et al. | |
| 7,379,594 B2 | * | 5/2008 | Ferman et al. | ............... 382/176 |
| 2004/0161152 A1 | | 8/2004 | Marconi et al. | |
| 2005/0002566 A1 | * | 1/2005 | Di Federico et al. | ......... 382/176 |
| 2005/0163372 A1 | | 7/2005 | Kida et al. | |

FOREIGN PATENT DOCUMENTS

| | | |
|---|---|---|
| EP | 0 613 294 | 8/1994 |
| EP | 0957631 | 11/1999 |
| EP | 1 333 665 | 8/2003 |
| EP | 1 560 417 | 8/2005 |
| GB | 2 418 316 | 3/2006 |
| WO | 9533337 | 12/1995 |
| WO | 0063838 | 10/2000 |
| WO | 0141117 | 6/2001 |

OTHER PUBLICATIONS

European Search Report dated Sep. 25, 2007 in EP Application No. 07252589.2.
European Search Report dated Jan. 14, 2008 in EP Application No. 07252590.0.
Partial Search Report dated Oct. 18, 2007 in Application No. 07252590.0.

(Continued)

*Primary Examiner* — Yon Couso
(74) *Attorney, Agent, or Firm* — Beyer Law Group LLP; Lisa K. Jorgenson

(57) ABSTRACT

The invention relates to determining the image content of an incoming bitstream such that various image improvement effects may be accomplished. The invention provides for determining a realness value of an image formed of a plurality of pixels each having associated pixel data by evaluating a spatial distribution of luminance values of the image. Realness values are first determined for subregions of an image frame through an analysis of a luminance histogram generated for each subregion. Subsequently, the subregion realness values are analyzed to generate a total realness value for the image frame and to classify the image content of the image frame.

21 Claims, 8 Drawing Sheets

OTHER PUBLICATIONS

Dimitrova et al., "On Selecting Video Content Analysis and Filtering", Proceedings of the SPIE, SPIE, vol. 3972, Jan. 26, 2000, pp. 359-368.

Goh, K. H. et al., "Automatic Video Contrast Enhancement", Consumer Electronics, 2004 IEEE International Symposium on Reading, UK, Sep. 1-3, 2004, pp. 359-364.

European Search Report dated Jan. 7, 2009 in EP Application No. 07252588.4.

European Search Report dated Jan. 7, 2009 in EP Application No. 07252587.6.

Notice of Allowance dated Jun. 29, 2010 in U.S. Appl. No. 11/525,276.

* cited by examiner

VIDEO CONTENT DETECTOR

CROSS REFERENCE TO RELATED APPLICATIONS

This application takes priority under 35 U.S.C. 119(e) of U.S. Provisional Application No. 60/816,903, filed Jun. 26, 2006 entitled "VIDEO WINDOW DETECTOR" by Neal that is also incorporated by reference in its entirety. This application is also related to the following co-pending U.S. Patent applications each of which are herein incorporated by reference in their entireties, (i) U.S. patent application Ser. No. 11/768,667, entitled "UNIVERSAL, HIGHLY CONFIGURABLE VIDEO AND GRAPHIC MEASUREMENT DEVICE" naming Neal as inventor; (ii) U.S. patent application Ser. No. 11/525,276, entitled "INTEGRATED HISTOGRAM AUTO ADAPTIVE CONTRAST CONTROL (ACC)", naming Neal as inventor; and (iii) U.S. patent application Ser. No. 11/565,464, entitled "VIDEO WINDOW DETECTOR" naming Neal as inventor.

FIELD OF THE INVENTION

This invention generally relates to improving video and graphics quality. In particular, the present invention relates to apparatus and methods for determining the type of image content, such as video, text, or a mixed combination, present in a video image.

BACKGROUND

Televisions, computer monitors and other display devices exist in a great multitude of display sizes and aspect ratios. For example, conventional television displays have a 4:3 (1.33:1) aspect ratio (hereafter referred to as a standard display) while widescreen displays, such as theater or HDTV displays, have a 16:9 (1.78:1) aspect ratio. There are also still wider displays having aspect ratios of 2.39:1 or 2.35:1. Moreover, a given display unit should be able to display the great multitude of video signal formats that exist. In order for a given display unit to display a format other than its own native format, various techniques are used to shrink or extend the aspect ratio of the normative format. Many of these techniques involve projecting the normative image in its original format onto the native display and simply blackening the "gaps" where no image information exists.

Letterboxing is the practice of transferring wider video formats, such as 16:9, to more square formats while preserving the original aspect ratio. The resulting video display must include masked-off areas above and below the picture area, often referred to as black bars, or, more accurately, as mattes. In contrast, pillarboxing, or windowboxing, is necessitated when video that was not originally designed for widescreen is shown on a widescreen display. The original material is shrunk and placed in the middle of the widescreen frame while vertical black bars are placed on either side. Lastly, there are sometimes instances in which standard ratio images are presented in the central portion of a letterboxed picture, resulting in a black border all around. This effect is referred to as matchboxing, and obviously wastes a great deal of screen space as well as reduces the resolution of the original image.

Although a controller for a television display generally "knows" that the incoming signal it is receiving is a video signal, the controller generally does not know the format of the incoming signal it is receiving. In the case of computer monitors, or monitors in general, even less is known about the incoming signal; that is, the monitor does not know whether it is receiving a video signal (such as from a DVD), a textual signal (such as from a computer), or a combination of both. Hence, it is difficult for the display controller to know how to best process the incoming signal.

In order to apply image improvement effects, such as color enhancement or other processing to a graphics or video image, it is necessary to know the nature of the image content; that is, it is desirable to know whether the image is largely real (a film or digital recording) or synthetic (artificial or textual image). In the case where a given display is letterboxed, pillarboxed, or both, it is further desirable to know which portions of the image frame are real and which are synthetic such that appropriate and efficient image processing is accomplished.

Therefore, it would be desirable to automatically determine the image content of an incoming signal into a display unit.

SUMMARY

Broadly speaking, the invention relates to determining the image content of an incoming bitstream such that image improvement effects such as better pixel allocation and increased luminance contrast levels may be accomplished. The invention can be implemented in numerous ways, including as a method, system, device, apparatus, or computer readable medium. Several embodiments of the invention are discussed below.

In embodiments of the present invention, a method of determining a realness value of an image formed of a plurality of pixels each having associated pixel data by evaluating a spatial distribution of luminance values of the image is described. The method may be carried out by: dividing the image into a number of image blocks, generating a luminance histogram for selected image blocks, and using the luminance histograms to determine a realness value for each of the selected image blocks. Determining a realness value for each image block may include determining a range of represented luminance values, determining a density of represented luminance values, and/or analyzing a distribution pattern of the represented bins thereby providing a distribution pattern of represented luminance values, for example. The realness values for each of the selected image blocks may then be used to determine the realness value for the image. The realness value for the image may then be compared to one or more specified values. In various embodiments, the image may be considered real if the total realness value is greater than a largest specified value, the image may be considered synthetic if the total realness value is less than a smallest specified value, and the image may be considered mixed if the total realness value is in between selected specified values.

In other embodiments of the present invention, an apparatus for determining a realness value of an image formed of a plurality of pixels each having associated pixel data by evaluating a spatial distribution of luminance values of the image is described. The apparatus includes means for dividing the image into a number of image blocks, means for generating a luminance histogram for selected image blocks, and means for using the luminance histograms to determine a realness value for each of the selected image blocks. Means for determining a realness value for each image block may include means for determining a range of represented luminance values, means for determining a density of represented luminance values, and/or means for analyzing a distribution pattern of the represented bins thereby providing a distribution pattern of represented luminance values, for example. The apparatus may also include means for determining the realness value of the image based upon the realness values obtained for each of the selected image blocks, as well as means for comparing the realness value obtained for the image to one or more specified values.

In still other embodiments of the present invention, computer program product executable by a processor for determining a realness value of an image formed of a plurality of pixels each having associated pixel data by evaluating a spatial distribution of luminance values of the image is described. The computer program product includes computer code for dividing the image into a number of image blocks, computer code for generating a luminance histogram for selected image blocks, and computer code for using the luminance histograms to determine a realness value for each of the selected image blocks. Computer code for determining a realness value for each image block may include computer code for determining a range of represented luminance values, computer code for determining a density of represented luminance values, and/or computer code for analyzing a distribution pattern of the represented bins thereby providing a distribution pattern of represented luminance values, for example. The computer program product may also include computer code for determining the realness value of the image based upon the realness values obtained for each of the selected image blocks, as well as computer code for comparing the realness value obtained for the image to one or more specified values. Computer readable medium for storing the computer code is also provided.

Other aspects and advantages of the invention will become apparent from the following detailed description taken in conjunction with the accompanying drawings.

BRIEF DESCRIPTION OF THE DRAWINGS

The invention, together with further objects and advantages thereof, may best be understood by reference to the following description taken in conjunction with the accompanying drawings in which.

In the drawings, like reference numerals designate like elements. Also, it should be understood that the depictions in the figures are not to scale.

DETAILED DESCRIPTION OF SELECTED EMBODIMENTS

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

Figure 1:
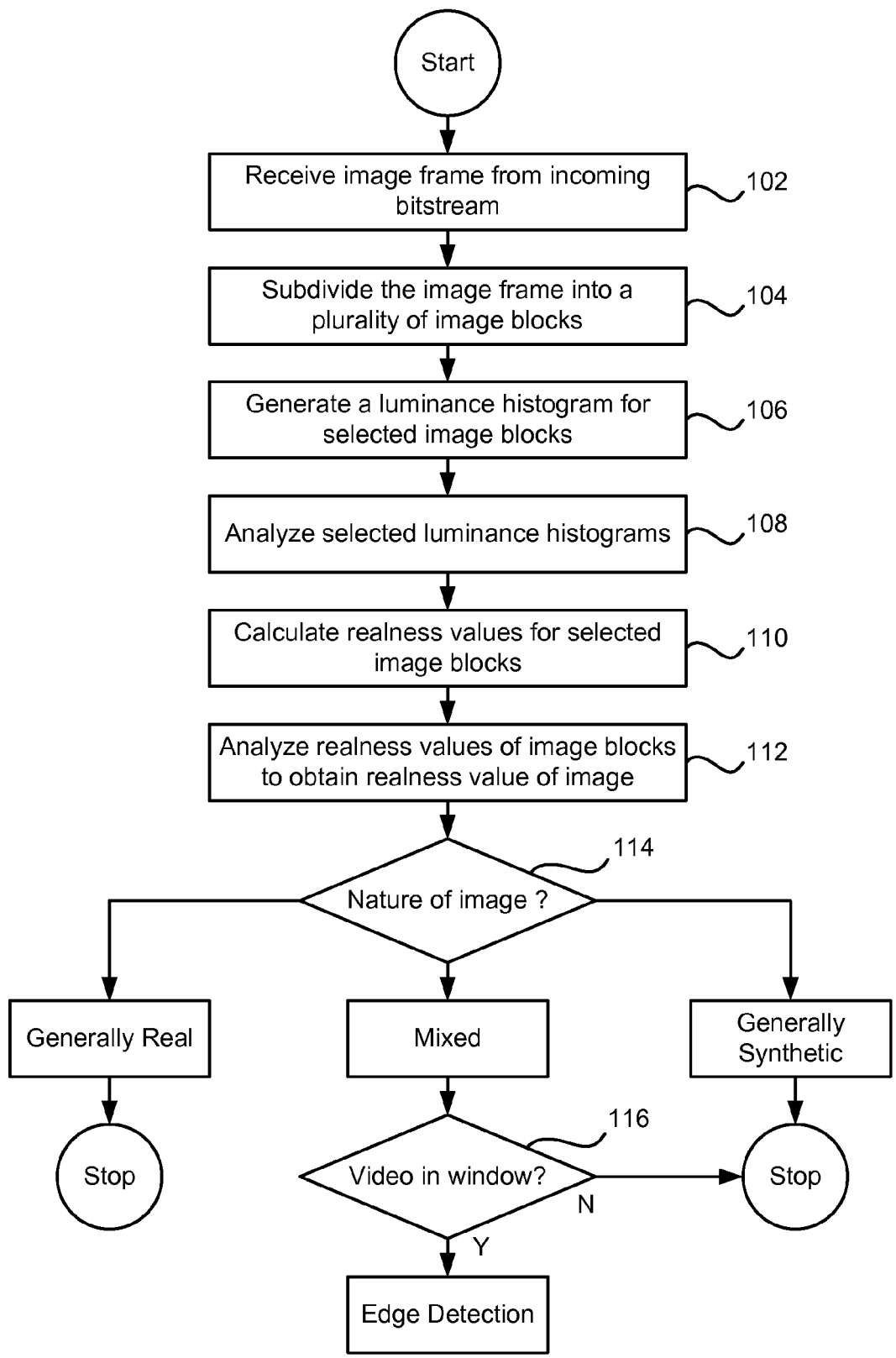
FIG. 1 shows a flowchart illustrating a process of determining a realness value of an image in accordance with an embodiment of the present invention.
Figure 2:
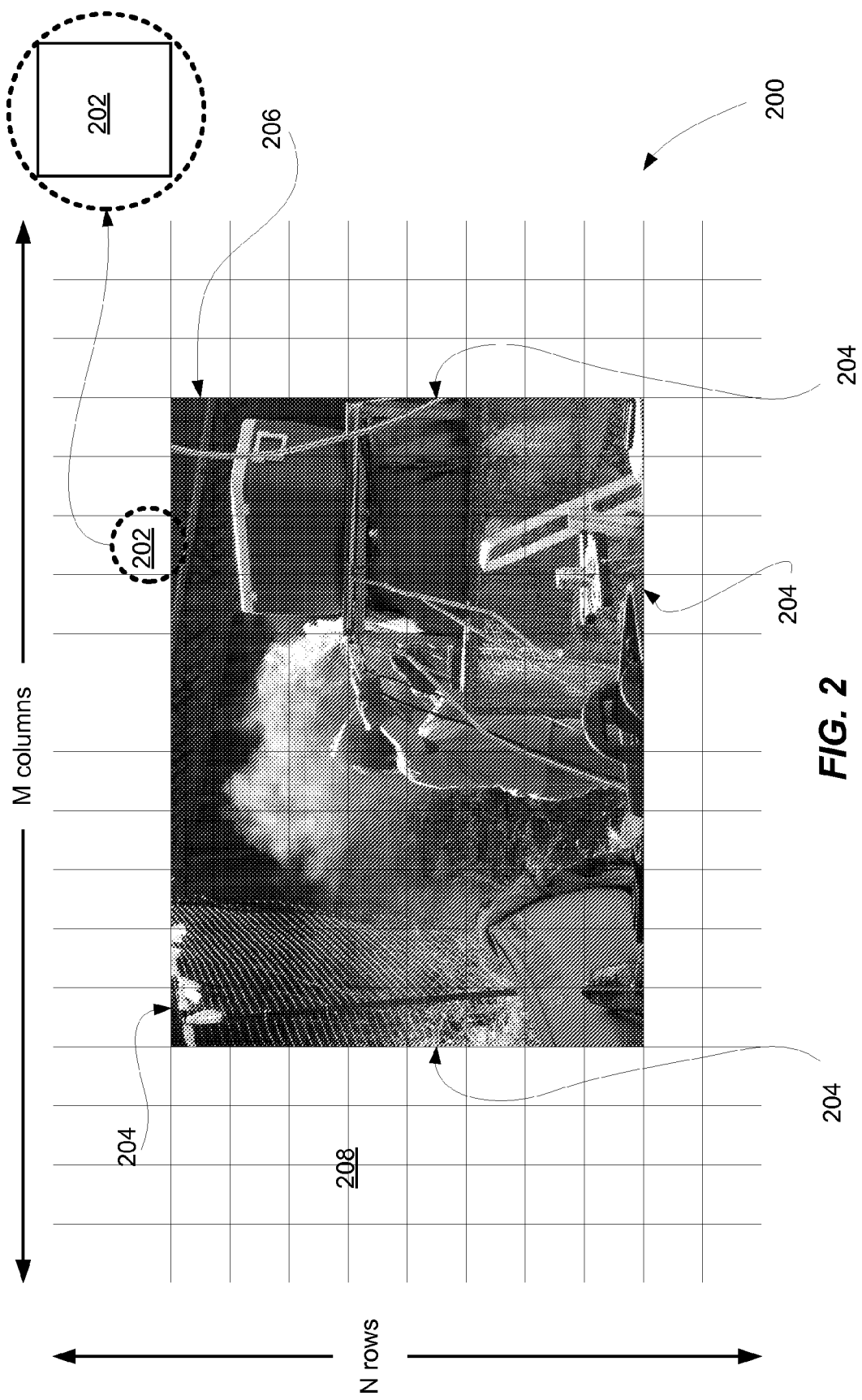
FIG. 2 shows a representative image frame subdivided into image blocks.

In an aspect of the present invention, a method of determining a realness value of an image formed of a plurality of pixels each having associated pixel data by evaluating the spatial distribution of luminance values of the image is described. In general, if an image is mostly synthetic, it is textual, if it is mostly real, it is video (or photo), if the image displays some of each, it is "mixed" if distributed unevenly, or "video-in-window" if concentrated in a large rectangle. An example of a mixed signal may be an Internet source displaying many small real images on a synthetic background. An example of a mixed signal may even be a synthetic photo or video recording that has been enhanced, perhaps through random luminance addition, to look more real. An example of a video-in-window signal may be an Internet source displaying a photo or video recording in an application window that is surrounded by a larger window or background displaying synthetic colors or text, as shown in FIG. 2 illustrating an image frame 200 having a real video image 206 with edges 204 and a synthetic background 208.

In one embodiment, an image frame is received at step 102 at a display unit that may be a television display or computer monitor configured in any number of formats such as 1.33:1 format, widescreen 1.78:1 format or widescreen 2.39:1 format. At step 104, the image frame is subdivided into a plurality of image blocks 202. In the described embodiment, each of the image blocks 202 is of equal size in physical dimension. The image blocks are organized into N rows and M columns. By way of example, the use of 32 columns and 30 rows of image blocks (resulting in 960 rectangular image blocks) has been shown to work well. It should be noted that each of the image blocks 202 need not be square, nor need they be of equal size. In other embodiments, the image blocks may be smaller, for example, in the center of the display or where a real image is expected.

As is known in the art, an RGB signal comprising the chroma portions red, green, and blue can be transformed into a YUV signal comprising the luminance portion Y, and two chroma portions U and V. Once an incoming RGB color space signal is converted to a corresponding YUV color space signal, the luminance portion, Y, for each of the pixels in an image block is used to generate a luminance histogram in step 106. In some embodiments, all of the pixels in the image block are used to generate a luminance histogram having a predefined number of luminance bins (such as 128) each of which represents a range of luminance values. It should be noted that in order to preserve computing time and/or resources, each bin of the luminance histogram may be represented in a computer memory by a single bit indicating whether or not a particular range of luminance values is represented. By way of example, a logic 1 may indicate that a bin is represented in the image block while a logic 0 may indicate that the particular bin is not represented.

Although it is contemplated that all, or substantially all, of the pixels in a particular image block are used, in some cases it may be preferable to use only selected ones of the pixels in a particular image block to generate the luminance histograms. In any case, once a luminance histogram is generated for a particular image block, a luminance histogram is generated for all, or substantially all, of the image blocks (however, in some cases it may be desirable to use only selected ones of the image blocks)

Once all of the luminance histograms have been generated, the luminance histograms are analyzed at step 108 in order to determine a spatial distribution of luminance across the displayed image. The analysis may include finding the bin representing the highest represented luminance value, finding the bin representing the lowest represented luminance value and determining the number of bins in between. This portion of the analysis may be used to estimate the range of represented luminance values in the image block. The wider the range, the more likely the content present in the image block is real; that is, that the content was produced through an analog or digital recording. In various embodiments, the density of represented luminance values in the image frame may be determined. In some embodiments, the density may be estimated as a number of bins represented out of the total range of represented bins for each image block. The greater the density of bins represented, the more likely that the image is real. In still other embodiments, a third method of analysis may be employed having to do with the pattern of represented bins. By way of example, if the represented bins are spread out, i.e. not clumped into a narrow range, then it is more likely that the image block is real.

The combination of one or more of the aforementioned analysis tools may then be used to estimate the "realness" of an image block in the image frame at 110. By way of example, a scale from 0 to 10, where a 0 indicates an entirely synthetic image block and a 10 indicates an entirely real image block, may be used to estimate a realness value for the image block. As stated earlier, a synthetic image will often have a very narrow range of luminances or a wide range but with many gaps in between. A real image will tend to have a wider range of luminances with most of the luminances in the range represented.

Figure 3A:
FIG. 3a shows an exemplary real image.
Figure 3B:
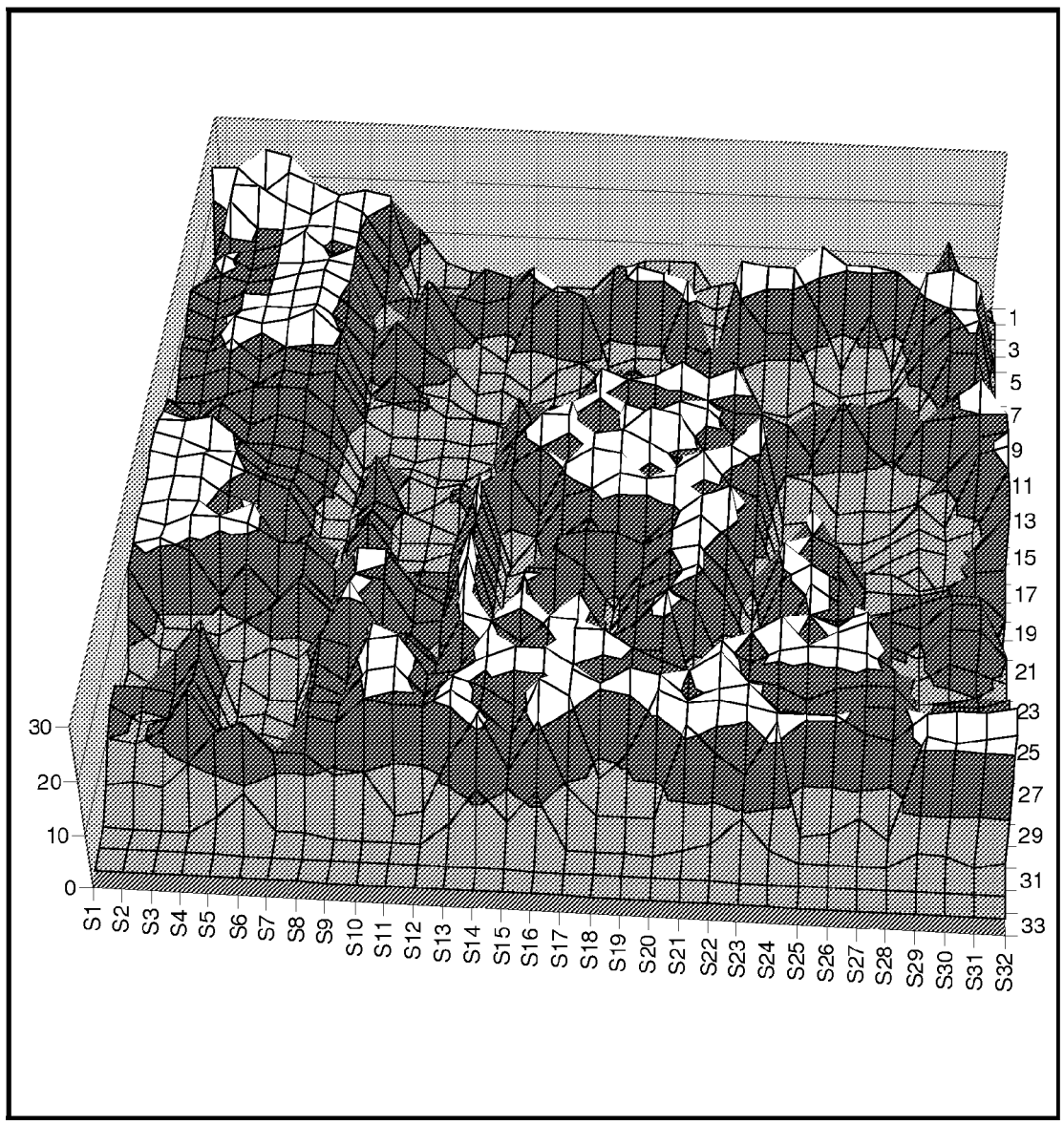
FIG. 3b shows an exemplary realness value plot of the associated real image of FIG. 3a in accordance with an embodiment of the present invention.
Figure 4A:
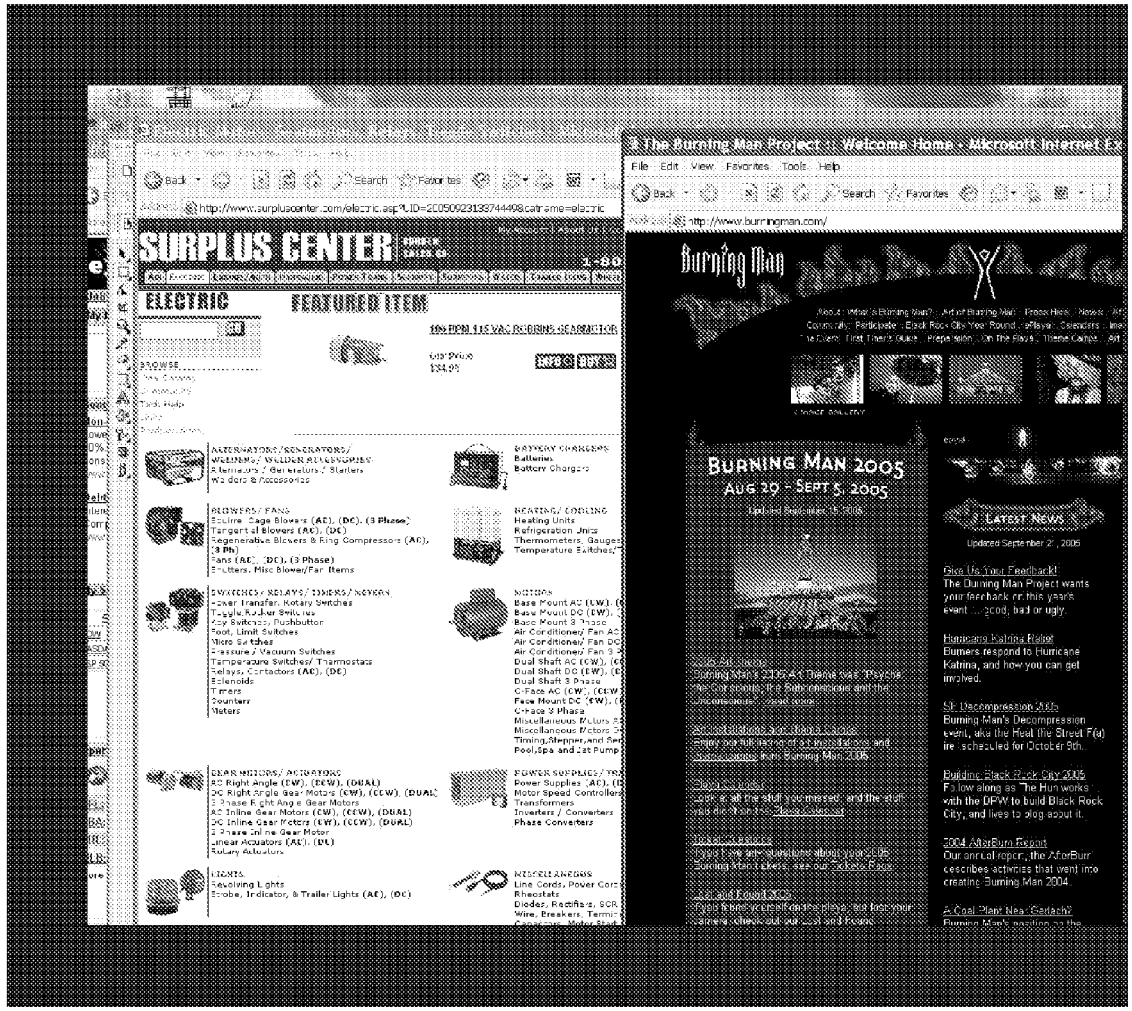
FIG. 4a shows an exemplary synthetic image.
Figure 4B:
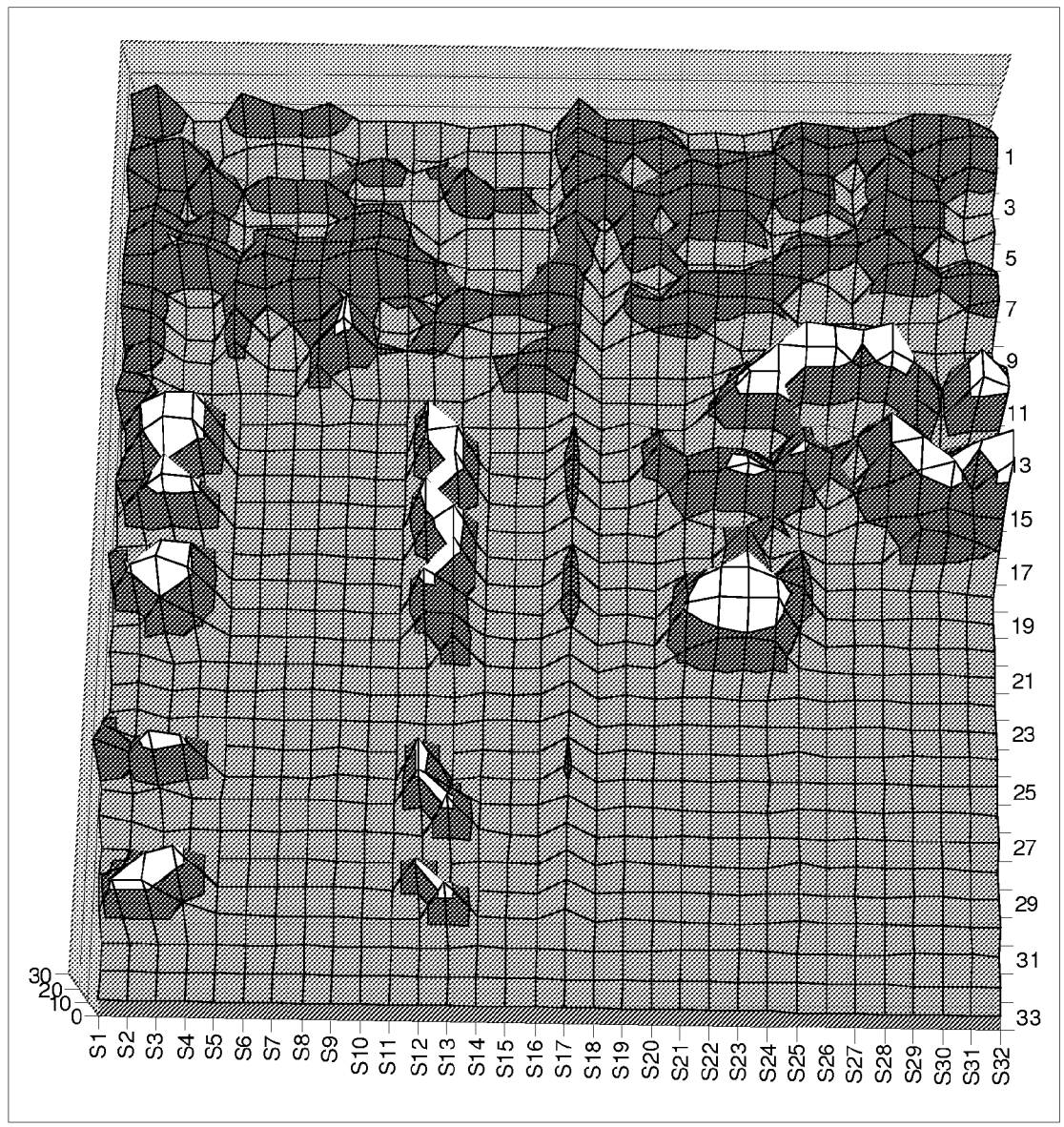
FIG. 4b shows an exemplary realness value plot of the associated synthetic image of FIG. 4a in accordance with an embodiment of the present invention.
Figure 5A:
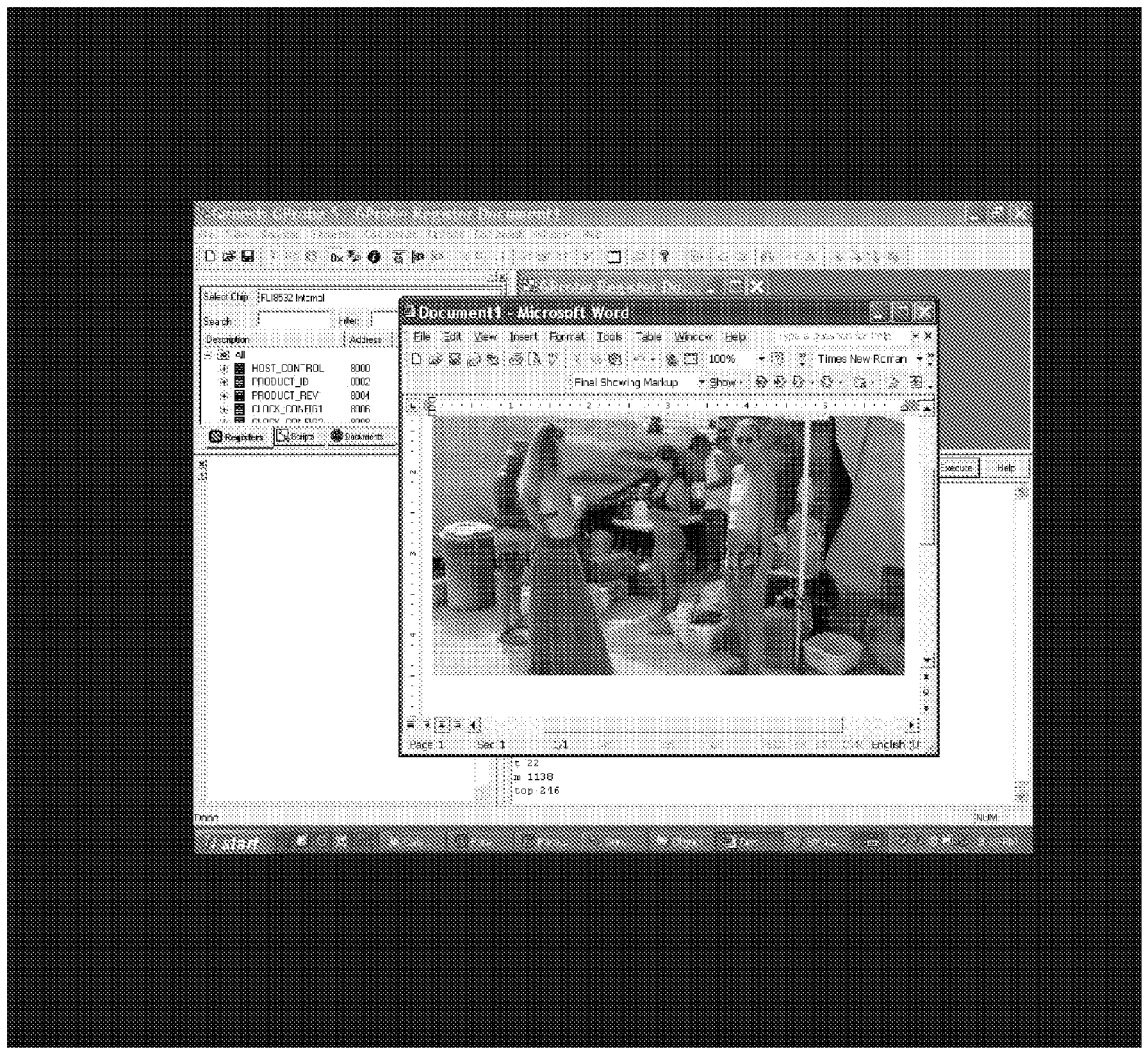
FIG. 5a shows an exemplary video-in-window image.
Figure 5B:
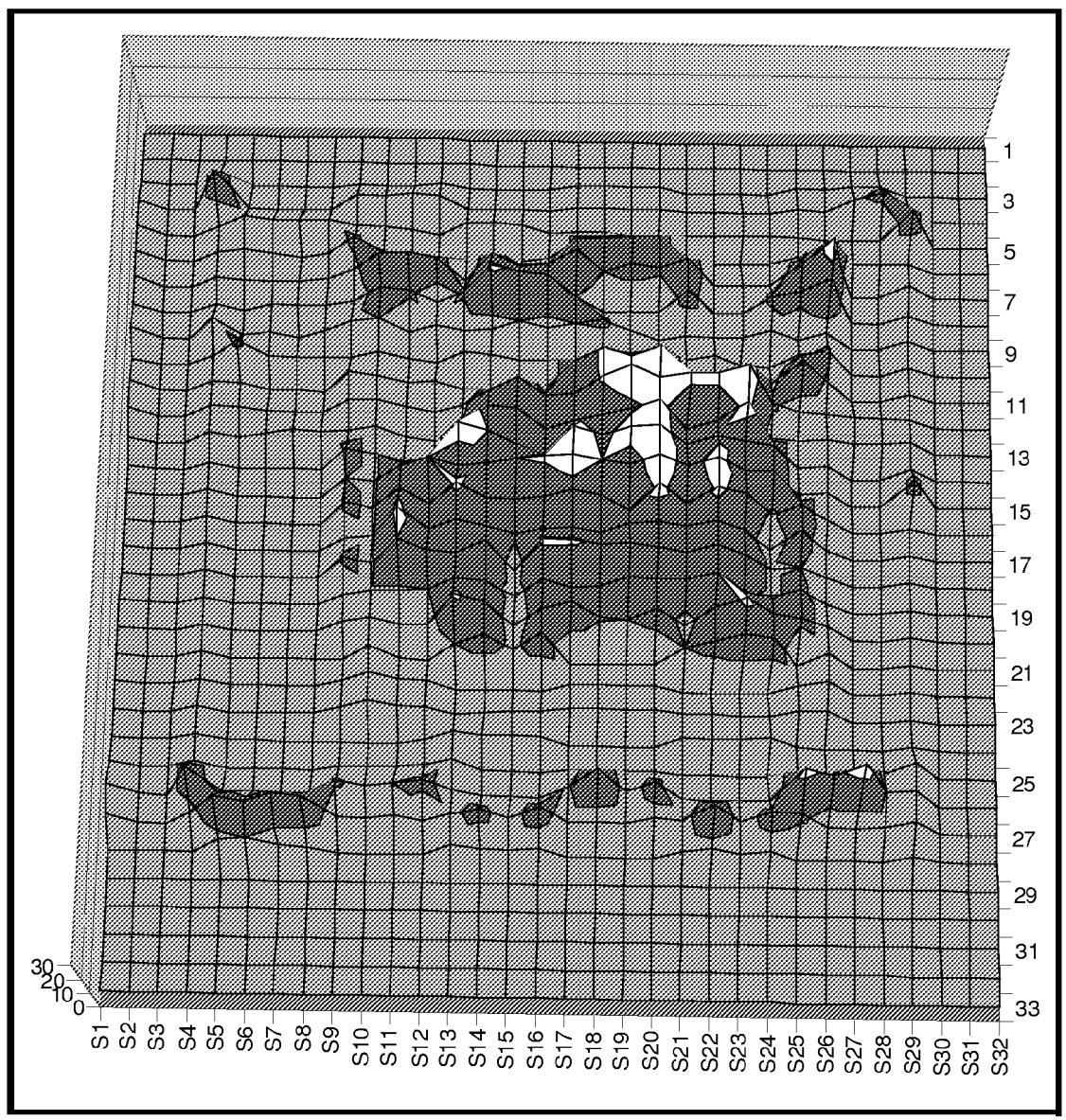
FIG. 5b shows an exemplary realness value plot of the associated video-in-window image of FIG. 5a in accordance with an embodiment of the present invention.

FIGS. 3a and 3b illustrate a real image and an associated two-dimensional rendition of a three-dimensional plot showing the realness values obtained for all of the image blocks of the image. The plot shows an image frame divided into 31 rows and 32 columns and having a height scale ranging from 0 to 30 representing the realness value of the image block. FIGS. 4a and 4b similarly illustrate a synthetic image and associated three-dimensional realness value plot. Lastly, FIGS. 5a and 5b similarly illustrate a video-in-window image and associated three-dimensional realness value plot. In the video-in-window example, the central region clearly shows the real portion of the image frame.

At 112, the realness values computed for the entire image frame may then be analyzed. By way of example, the realness values may simply be added to obtain a realness value for a region of the image frame, or the image frame in its entirety. At 114, the nature of the image content of the image frame is determined. The image may be classified into one of a number of categories based upon a comparison between its realness value and one or more specified values. If the realness value computed for the image is greater than a largest specified value, the image may be considered real, if the realness value of the image is less than a smallest specified value, the image may be considered synthetic, and if the realness value of the image is in between selected specified values, the image may be considered mixed. The specified values used for comparison may be fixed predetermined numbers, or numbers that are made variable.

As alluded to earlier, in the case of mixed images, it is further desirable to determine if the mixed image is a video-in-window image such that various image improvement effects might be performed on the real (windowed) portion. Video-in-window detection may be achieved by analyzing the distribution of the realness values of the image blocks in the image frame. In a display unit configured to display a native video format, if a video-in-window signal is detected, a better allocation of pixels may be achieved. As mentioned in the background, a matchboxing effect may result from a combination of letterboxing followed by pillarboxing, such as would be observed if a standard format advertisement is incorporated into a widescreen display format being displayed on a standard format display unit. In this manner, the video-in-window signal that would normally be dramatically reduced in size and resolution, may be displayed in a format more consistent with the display as well as that intended by the source. In order to make such image improvements, it is necessary to define the edges of the video window, that is, the boundaries between the real video and the synthetic background. Such a boundary edge detection process 116 is described in detail in co-pending patent application entitled, "Video Window Detector" by Neal having application Ser. No. 11/565,464, which is incorporated herein by reference in its entirety for all purposes.

Finally, it should be noted that the described realness measurement need not be performed on every frame in all embodiments. By way of example, it has been shown that performing the realness measurement every four frames is sufficient for many applications while not burdening memory resources.

Embodiments of the invention, including the apparatus disclosed herein, can be implemented in digital electronic circuitry, or in computer hardware, firmware, software, or in combinations of them. Apparatus embodiments of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. Embodiments of the invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other embodiments are within the scope of the following claims.

The invention claimed is:

1. A method of analyzing an image formed of a plurality of pixels each having associated pixel data, comprising:
    dividing the image into a number of image blocks;
    generating a luminance histogram for selected image blocks;
    evaluating, using a processor, the luminance histogram of the selected image blocks to determine a block realness value for each of the selected image blocks by determining one or more of a group including a range of represented luminance values, a density of represented luminance values and a distribution pattern of represented luminance values;
    using the block realness values to determine an image realness value; and
    classifying the image based on the image realness value into one of at least three different image categories, including a real image, a synthetic image, and a mixed image.

2. A method as recited in claim 1, wherein the image is divided into image blocks of equal size.

3. A method as recited in claim 1, wherein each bin of the luminance histogram is represented by 1 bit indicating whether or not a particular range of luminance values is represented in the image block.

4. A method as recited in claim 1, further comprising identifying for the mixed image whether a distribution of realness values has a shape that corresponds to a video-in-window image.

5. A method as recited in claim 1, wherein the image is considered real if the realness value of the image is greater than a largest specified value, wherein the image is considered synthetic if the realness value of the image is less than a smallest specified value, and considered mixed if the realness value of the image is in between selected specified values.

6. An apparatus for analyzing an image formed of a plurality of pixels each having associated pixel data, comprising:
    a processor configured to:
        divide the image into a number of image blocks;
        generate a luminance histogram for selected image blocks;
        use said luminance histograms to determine a block realness value for each of said selected image blocks by determining one or more of a group including a range of represented luminance values, a density of represented luminance values and a distribution pattern of represented luminance values;
        use said block realness values to determine an image realness value; and
        classify the image based on the realness value into one of at least three different image categories, including a real image, a synthetic image, and a mixed image.

7. An apparatus as recited in claim 6, wherein the image is divided into image blocks of equal size.

8. An apparatus as recited in claim 6, wherein each bin of the luminance histogram is represented by 1 bit and stored in a means of storage indicating whether or not a particular range of luminance values is represented in the image block.

9. An apparatus as recited in claim 6, further comprising determining realness values for each, and all, of the image blocks in the image.

10. An apparatus as recited in claim 6, further comprising means for determining if the mixed image is a video-in-window image.

11. An apparatus as recited in claim 6, wherein the image is considered real if the realness value of the image is greater than a largest specified value, wherein the image is considered synthetic if the realness value of the image is less than a smallest specified value, and considered mixed if the realness value of the image is in between selected specified values.

12. A non-transitory computer-readable medium having a computer program executable by a processor for determining a realness value of a displayed image formed of a plurality of pixels each having associated pixel data, the computer program comprising:
    computer code for dividing the image into a number of image blocks;
    computer code for generating a luminance histogram for selected image blocks;
    computer code for evaluating the luminance histogram of the selected image blocks to determine a block realness value for each of the selected image blocks by determining one or more of a group including a range of represented luminance values, a density of represented luminance values and a distribution pattern of represented luminance values;
    computer code for using the block realness values to determine an image realness value; and
    computer code for classifying the image based on the image realness value into one of at least three different image categories, including a generally real image, a generally synthetic image, and a mixed image.

13. The non-transitory computer-readable medium as recited in claim 11, wherein the image is divided into image blocks of equal size.

14. The non-transitory computer-readable medium as recited in claim 11, further comprising computer code for representing each bin of the luminance histogram by 1 bit indicating whether or not a particular range of luminance values is represented in the image block.

15. The non-transitory computer-readable medium as recited in claim 11, further comprising determining realness values for each, and all, of the image blocks in the image.

16. The non-transitory computer-readable medium as recited in claim 11, further comprising computer code for determining if the mixed image is a video-in-window image.

17. The non-transitory computer-readable medium as recited in claim 11, wherein the image is considered real if the realness value of the image is greater than a largest specified value, wherein the image is considered synthetic if the realness value of the image is less than a smallest specified value, and considered mixed if the realness value of the image is in between selected specified values.

18. A method of analyzing an image, comprising:
    dividing the image into a number of image blocks;
    generating a luminance histogram for selected image blocks, wherein each bin of the luminance histogram is represented by 1 bit indicating whether or not a particular range of luminance values is represented in the image block;
    evaluating, using a processor, the luminance histogram of the selected image blocks to determine a block realness value for each of the selected image;
    using the block realness values to determine an image realness value; and
    classifying the image based on the image realness value into one of at least three different image categories, including a real image, a synthetic image, and a mixed image.

19. A method of analyzing an image, comprising:
    determining a realness value of an image formed of a plurality of pixels each having associated pixel data by evaluating, using a processor, a spatial distribution of luminance values of the image;

classifying the image based on the realness value into one of at least three different image categories, including a real image, a synthetic image, and a mixed image; and determining if the mixed image is a video-in-window image.

20. An apparatus for analyzing an image formed of a plurality of pixels each having associated pixel data, comprising:

a processor configured to:

divide the image into a number of image blocks;

generate a luminance histogram for selected image blocks, wherein each bin of the luminance histogram is represented by 1 bit indicating whether or not a particular range of luminance values is represented in the image block;

use said luminance histograms to determine a block realness value for each of said selected image blocks;

use said block realness values to determine an image realness value; and classify the image based on the realness value into one of at least three different image categories, including a real image, a synthetic image, and a mixed image.

21. An integrated circuit configured to analyze an image, comprising:

a processor adapted to:

determine a realness value of an image formed of a plurality of pixels each having associated pixel data by evaluating a spatial distribution of luminance values of the image;

classify the image based on the realness value into one of at least three different image categories, including a real image, a synthetic image and a mixed image; and determine if the mixed image is a video-in-window image.

* * * * *